UNITED STATES PATENT OFFICE.

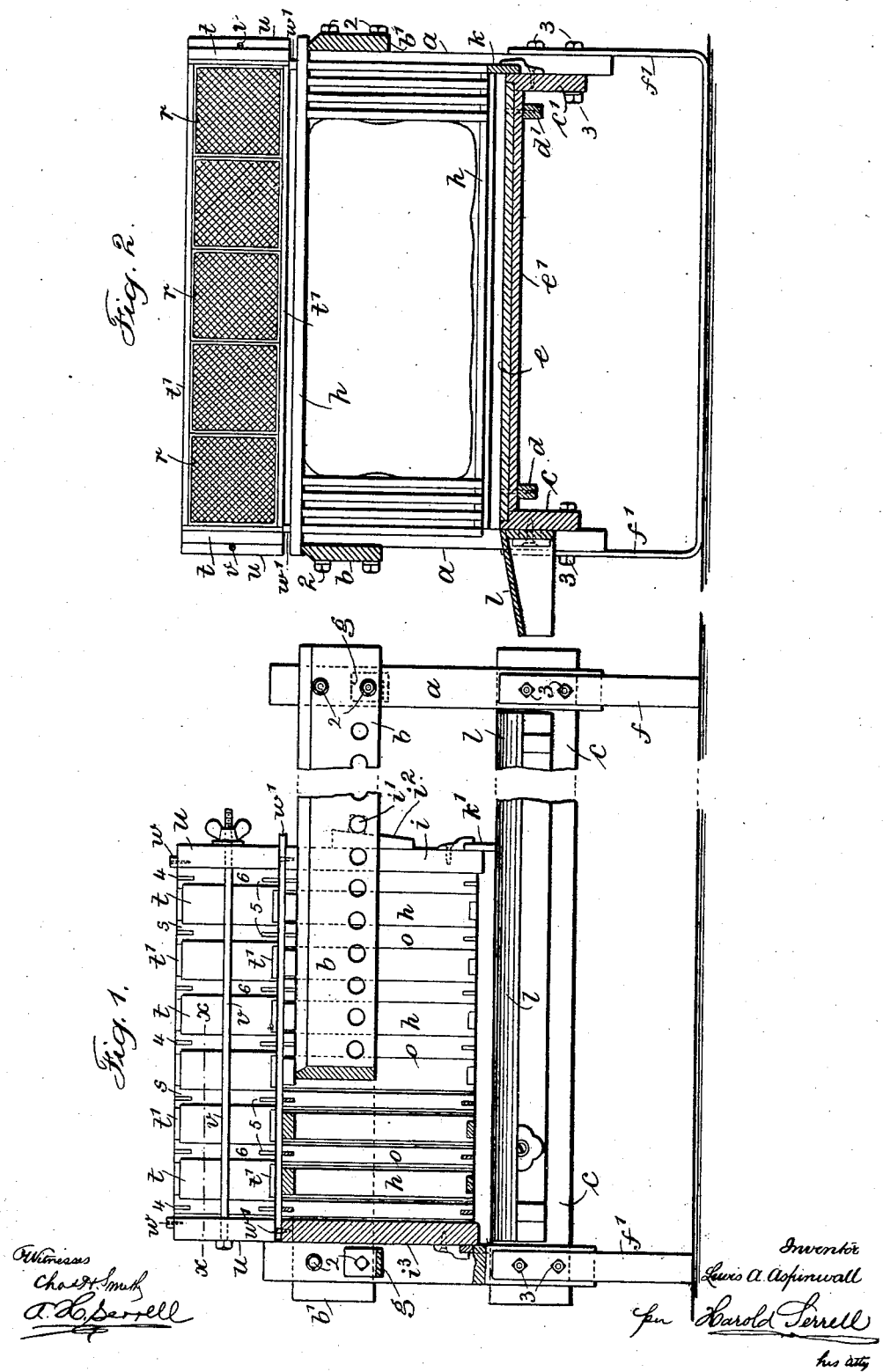

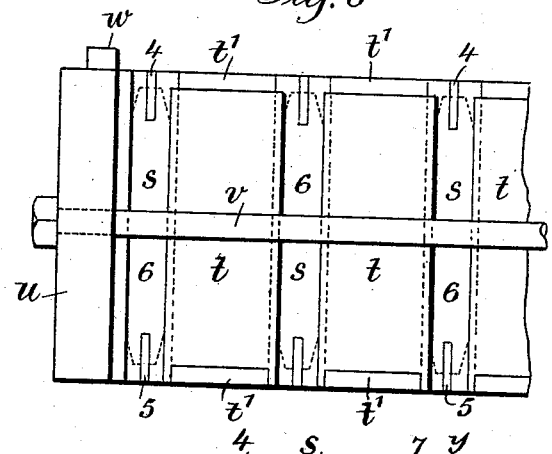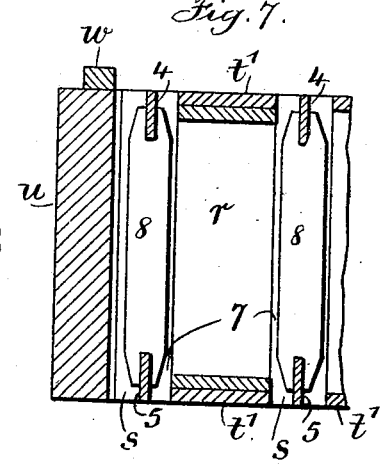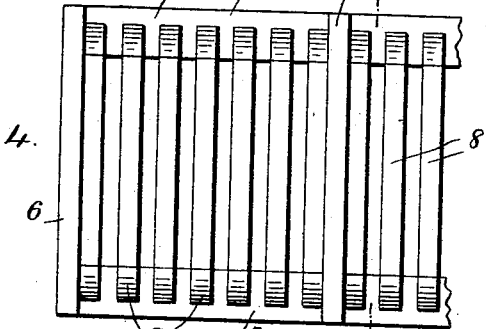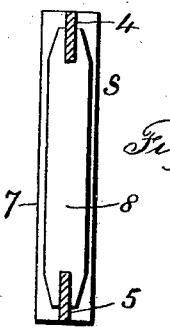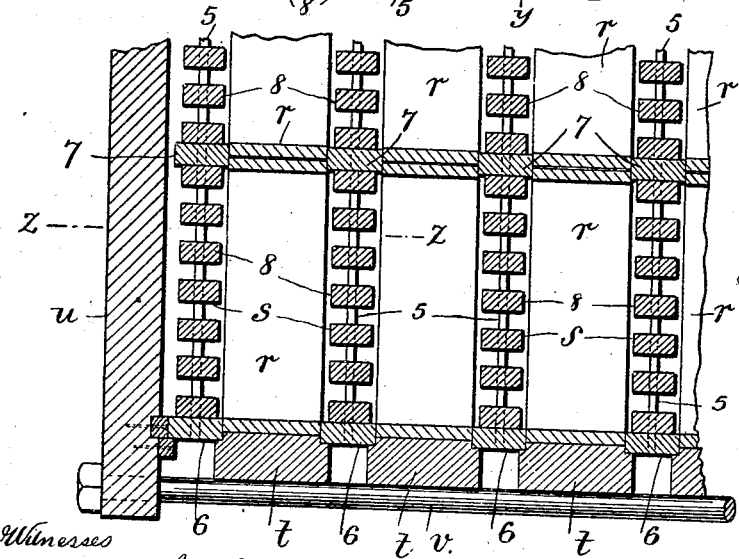

LEWIS AUGUSTUS ASPINWALL, OF JACKSON, MICHIGAN.

BEEHIVE.

No. 891,585.  Specification of Letters Patent.  Patented June 23, 1908.

Application filed February 3, 1908. Serial No. 413,971.

*To all whom it may concern:*

Be it known that I, LEWIS AUGUSTUS ASPINWALL, a citizen of the United States, residing at Jackson, in the county of Jackson and State of Michigan, have invented an Improvement in Beehives, of which the following is a specification.

My invention relates to improvements in that portion of the beehive known as the super, which contains the sections or honey boxes and the same is designed for use essentially in connection with non-swarming hive devices, such especially as I have described in my applications of like date herewith and in which the passage-ways are exceptionally commodious and the object of my invention is the construction of said super with equal facilities and accommodation for the bees with the other parts of the hive.

In carrying out my invention, the supers are each constructed with separating slatted frames or separators of peculiar construction, which provide bee passage ways between the parts, and collectively between the parts and the sections, each separator being divided into a series of spaces, so that the spaces between the adjacent honey sections or boxes of the supers, are separated from the spaces between the other adjacent honey sections.

In further carrying out my invention, section holders are used and constructed with a removable slat or cover the same width as the sections, to protect them from being propolized, gummed, or otherwise soiled by the bees. Also to enable the placing of the supers in position without the killing of bees I employ removable slats to inclose the bee space between them and the hive, or added ones above, are used both at the front and rear of said bee space. The sections and their separating slatted frames are adapted to be connected and collectively moved about and set upon the hive with the spaces provided in the hive freely communicating with the spaces of the slatted frames between the sections.

In an application Serial No. 413,969, filed by me of even date herewith, I have described and illustrated an improvement in the comb-frames, while in another application Serial No. 413,970 filed by me of even date herewith, I have shown and described improvements in the slatted or dummy frames, which are adapted to be placed between and alternately with the comb-frames, and the improvement in my present invention is the arrangement of the supers and the slatted frames contained therein and which are adapted for use with the devices of either of the aforesaid applications, especially with the device of the application in which the slatted or dummy frames are employed with the comb-frames; it being preferable to make the comb-frames and the supers substantially the same width so that the slatted or dummy frames between the comb-frames and the slatted frames between the sections will be substantially superimposed in the complete hive, providing ample accommodation for the bees between the main frame and the over-head structure of supers and slatted frames.

In the drawing, Figure 1 is a front elevation partly in section, and Fig. 2 a vertical cross elevation representing the devices of my improvement. Fig. 3 is a sectional plan at about the dotted line $x$, $x$, of Fig. 1, through a portion of the sections and slatted frames. Fig. 4 is an elevation of a portion of one of the slatted frames. Fig. 5 is a vertical cross section at the dotted line $y$, $y$, of Fig. 4. Fig. 6 is a side elevation of a portion of the super and Fig. 7 is a cross section at $z$, $z$, of Fig. 5 of the parts shown on Figs. 3 and 7, and in larger size than in Figs. 1 and 2.

As shown in Figs. 1 and 2, and as illustrated in my applications of even date herewith, the hive of my improved construction is provided with upright end members $a$, longitudinal frame members $b$ $b^1$ on the outside of the members $a$, longitudinal rabbeted members $c$ $c^1$ on the inside of the members $a$; the said parts connected to the members $a$ by bolts 2 and 3 and the rabbeted edges of the members $c$ $c^1$ receive the bottom boards $e$ $e^1$ which are in series securely connected by the cleats $d$ $d^1$. Also that there are metal supports $f f^1$ and metal stays $g$, an end-board $i^3$, a closing board $i$, comb-frames $h$ with intermediate slatted or dummy frames $o$, each of said frames having parts overhanging and resting upon the upper edges of the members $b$ $b^1$ and in connection with which structure I employ a locking-bar $i^1$ and wedge $i^2$, closing strips $k$ $k^1$ and an alighting board $l$.

Without necessarily going into the description of the comb-frames $h$ or the slatted or dummy frames $o$, it may be sufficient to remark that these parts which form no important portion of my present invention, are constructed the same as shown and described in my aforesaid applications which are of even date herewith.

The section holders which constitute a part of the supers $r$, are arranged in series set lengthwise and they are arranged in such series alternating with the slatted frames $s$. These are the sections or honey boxes in which the bees store honey and which are the usual receptacles of honey for the market, being removed from the holders supported upon the top of the hive. Each of the slatted frames is composed of narrow top and bottom strips or bars 4 5, with the longest dimensions set vertical, with end pieces 6 and with intermediate pieces 7 spaced apart and at distances from the end-pieces 6 determined by the size of the sections $r$ so that as shown in the plan view Fig. 3, an intermediate piece 7 comes at each line of union of two sections or honey boxes, so as to close off between the sections and close one from the other. Between the end pieces 6 and 7 there are spaced apart pieces 8. The ends of all the pieces 6 7 and 8 are grooved to receive edge-wise the top and bottom narrow bars 4 5 in forming the slatted frames and the ends of the pieces 8 are beveled or chamfered. The pieces 8 are placed apart a full bee space, or about a quarter of an inch in actual dimensions and they are distant a quarter of an inch or a bee space from the edge of the honey cells in the section holders, while slightly more room is provided at the respective ends of the pieces 8 by the chamfering or beveled conditions of the strips.

I provide holders for the sections in their longitudinal series, which holders are composed of heavy end-pieces $t$ and narrow top and bottom pieces $t^1$ which are narrower than the end-pieces $t$; the vertical inner corners of the end-pieces $t$ being grooved to the edges of the pieces $t^1$ and serving to receive the sections between them; the slatted frames, or separators $s$, being of a depth vertically agreeing with the combined depth of the end-pieces $t$ and the top and bottom pieces $t^1$; therefore in height the slatted frames $s$ clamp equally with the top and bottom bars $t^1$ and the end pieces $t$ and cover and protect the sections especially as the inventor states from being propolized. These being removable are placed in position to cover and protect the sections when filling the supers preparatory to placing them on the hive for the storage of honey; and are clamped and held in position by the uprights of the slatted frames or separators. Holders with permanent top pieces have been made, but the difficulty of removing the sections is a serious objection to their use.

It will be noticed from the plan Fig. 3, that the end-pieces 6 of the slatted frames are received in the corner grooves of the end-pieces $t$; their opposite faces contacting with the end-pieces with the sections and with the top and bottom bars $t^1$ at the opposite ends of the end-pieces $t$; the parts thus fit snugly and in contact and when clamped are held firmly together.

At opposite ends of the series of sections and slatted frames I employ clamping boards $u$ and bolts $v$ pass through the projecting ends of these clamping boards and along the length of the series of sections or slatted frames on opposite sides; said bolts serving to securely clamp together the series of frames holding the sections and the slatted frames so that the entire mass may be moved together if desired.

I have shown and prefer to employ along the top edges of the clamping-boards $u$ cleats $w$ nailed thereto, the said cleats serving to support other series of supers and slatted frames when tiering, thus affording bee space between the superimposed series of slatted frames and super frames, and by this arrangement all danger of killing the bees is avoided. For closing the front and back sides, a loose or removable strip $w^1$ is used and placed in position when putting on the super. It is usual with these hives, although I have not shown it, to employ several thicknesses of muslin placed on the hive and as a cover over the hive to retain the warmth; the usual fixed hive cover being placed over all the parts.

With increased communication between the hive proper and the supers, with ample space between the sections and slatted frames and also ample space between the comb-frames and the dummy frames tends to reduce the crowded condition of the colony and with the slatted frames below overcomes all tendency to swarm, thus increasing the storage of honey in the supers. With increased communication between the hive proper and supers, the tendency to deposit pollen in the storage combs or sections becomes very great. To counteract this tendency I use two kinds of comb foundation. As pollen is invariably stored in worker cells the use of drone size, (being larger cells) will entirely prevent its storage in the supers. We find however, the bees naturally require or build combs having two kinds of cells, so that the use of drone size exclusively will not result in the storage of a maximum amount of honey. But both kinds being exactly suited to the requirements of the bees, results in the storage of much more honey. In view of the fact that pollen is generally stored above the brood area, an arrangement of the drone cell foundation at the center or above the brood combs, and the worker cell foundation at or above the slatted ends of the comb frames, most satisfactory results are obtained. The quality of honey so obtained is also much improved. The two kinds of cells being in harmony with their requirements, the colony also maintains its storage of honey with much greater rapidity.

I claim as my invention:

1. The combination with holders for honey comb, of separators and slats connected therewith and placed between the said holders in alternating series and maintaining but not impeding inter-communication, end clamping boards and means for holding the said parts together.

2. The combination with holders for honey comb, of slatted frames connected therewith and placed between the said holders in alternating series and maintaining but not impeding inter-communication, end clamping boards and means for holding the said parts together.

3. A holder for comb-honey sections in series composed of end pieces secured to the bottom bar and having a removable top bar forming the frame and receiving a series of comb-honey sections and a slatted frame composed of vertical pieces and top and bottom strips adapted to be placed at the opposite sides of each of said frames and the said frames and slatted frames arranged in series.

4. A holder for comb-honey sections in series, composed of end pieces having a removable top bar and bottom bar forming the frame and receiving a series of comb-honey sections, and a slatted frame composed of narrow top and bottom bars, end pieces, spaced apart pieces which come at the intersections of the supers and other narrower intermediate pieces spaced apart and adapted to leave full bee spaces between the same and in opposite planes between the same and the planes of the sections and said frames arranged in series.

5. A frame for the honey sections in series composed of the end-pieces $t$ having grooves along their inner edges, and bottom pieces $t^1$ narrower than the end-pieces, and slatted frames each composed of narrow top and bottom bars 4 5, end-pieces 6, intermediate pieces 7 and spaced apart and agreeing with the intersections of the honey sections and with intermediate pieces 8 coming between the pieces 7 and between the end pieces 6 and the nearest piece 7, the end pieces 6 being received in the grooves of the end-pieces $t$ and coming against the faces of the top and bottom pieces $t^1$ and means for clamping the said frames in series.

6. A holder for comb-honey sections in series, composed of end-pieces and bottom bar, with a removable top bar, forming the frame and receiving a series of comb-honey sections and a slatted frame composed of narrow top and bottom bars, end-pieces, spaced apart pieces which come at the intersections of the sections and other narrower intermediate pieces spaced apart and adapted to leave full bee spaces between the same and in opposite planes between the same and the planes of the sections and said frames arranged in series; clamping-boards $u$ coming at the ends of the series of slatted frames and super frames, and bolts $v$ with thumb nuts at opposite sides clamping the series compactly together.

7. A frame for honey sections in series, composed of the end-pieces $t$ having grooves along their inner edges, top and bottom pieces $t^1$ narrower than the end-pieces and of a width agreeing with the distance between the grooves, slatted frames each composed of narrow top and bottom bars 4 5, end pieces 6, intermediate pieces 7 of the same length as the end pieces 6 and spaced apart and agreeing with the intersections of the honey sections and with intermediate pieces 8 coming between the pieces 7 and between the end pieces 6 and the nearest piece 7, the end pieces 6 received in the grooves of the end pieces $t$ and coming against the faces of the top and bottom pieces $t^1$, means for clamping the said frames with removable top bars in series, clamping-boards $u$ coming at the ends of the series of slatted frames and super frames, and bolts $v$ with thumb nuts at opposite sides clamping the series compactly together.

8. A holder for comb-honey supers in series, composed of end-pieces and bottom bar, a removable top bar forming the frame and receiving a series of comb-honey sections and a slatted frame composed of narrow top and bottom bars, end-pieces, spaced apart pieces which come at the intersections of the supers and other narrower intermediate pieces spaced apart and adapted to leave full bee spaces between the same and in opposite planes between the same, and the planes of the honey sections and said frames arranged in series, clamping-boards $u$ coming at the ends of the series of slatted frames and super frames, and bolts $v$ with thumb nuts at opposite sides clamping the series compactly together, and cleats $w$ on the upper edge of the clamping boards $u$ and the loose pieces $w'$ to raise the super above the hive and also to raise other superimposed frames composing the super in tiering.

9. A frame or holder for honey sections in series, composed of the end-pieces $t$ having grooves along their inner edges, top and bottom pieces $t^1$ narrower than the end-pieces and of a width agreeing with the distance between the grooves, slatted frames each composed of narrow top and bottom bars 4, 5, end-pieces 6, intermediate pieces 7 of the same size as the end-pieces 6 and spaced apart and agreeing with the inter-sections of the honey sections and with intermediate pieces 8 coming between the pieces 7 and between the end-pieces 6 and the nearest piece 7, the end-pieces 6 being received in the grooves of the end-pieces $t$ and coming against the faces of top and bottom pieces $t^1$, means for clamping the said frames in series, clamping-boards u coming at the ends of the series of slatted frames and super frames, bolts v and thumb nuts at opposite sides clamping the series compactly together and spacing cleats w on the upper edge of the clamping-boards u and the loose strip for closing the front and rear inclosing the bee space and to raise the same above the hive, also to raise other superimposed frames comprising the super in tiering.

Signed by me this ninth day of Jan., 1908.

LEWIS AUGUSTUS ASPINWALL.

Witnesses:
 C. G. ROWLEY,
 GEO. N. WHITNEY.